United States Patent
Friederichs, III

(10) Patent No.: US 6,625,921 B2
(45) Date of Patent: Sep. 30, 2003

(54) FISHHOOK THREADER

(76) Inventor: N. Paul Friederichs, III, 13194 Yukon St. NW., Coon Rapids, MN (US) 55448

( * ) Notice: Subject to any disclaimer, the term of this patent is extended or adjusted under 35 U.S.C. 154(b) by 0 days.

(21) Appl. No.: 09/852,989

(22) Filed: May 9, 2001

(65) Prior Publication Data

US 2001/0039754 A1 Nov. 15, 2001

Related U.S. Application Data

(60) Provisional application No. 60/202,707, filed on May 9, 2000.

(51) Int. Cl.[7] .................. A01K 97/00; A01K 83/00
(52) U.S. Cl. .................. 43/4; 43/44.83; 43/43.16
(58) Field of Search .................. 43/4, 57.1, 43.16, 43/42.1, 42.4, 42.41, 43.2, 1, 44.83; 223/99; 112/224, 225

(56) References Cited

U.S. PATENT DOCUMENTS

| | | | | |
|---|---|---|---|---|
| 232,185 A | * | 9/1880 | Jaccard | 223/99 |
| 886,375 A | * | 5/1908 | Koon | 223/99 |
| 1,090,916 A | * | 3/1914 | Hertel | 223/99 |
| 2,091,893 A | * | 8/1937 | Tillinghast | 43/53.5 |
| 2,460,672 A | * | 2/1949 | Benedik | 223/99 |
| 2,502,816 A | * | 4/1950 | Bennek | 43/4 |
| 2,518,590 A | * | 8/1950 | Andrist | 43/4 |
| 2,531,551 A | * | 11/1950 | Brecht et al. | 43/4 |
| 2,547,592 A | * | 4/1951 | Morris | 43/53.5 |
| 2,641,078 A | * | 6/1953 | Gearien | 43/5 |
| 2,682,126 A | * | 6/1954 | Shepherd | 223/99 |
| 2,733,533 A | * | 2/1956 | Standard | 43/43.2 |
| 3,308,570 A | * | 3/1967 | Horton | 43/4 |
| 3,357,086 A | * | 12/1967 | Hood | 223/99 |
| 3,541,722 A | * | 11/1970 | Garrison | 43/4 |
| 3,722,128 A | * | 3/1973 | Tremblay | 43/43.2 |
| 3,819,099 A | * | 6/1974 | Bierenfeld | 29/241 |
| 3,872,616 A | * | 3/1975 | Poland | 43/4.5 |
| 3,905,145 A | * | 9/1975 | Cunningham | 43/53.5 |
| 4,118,807 A | * | 10/1978 | McCauley | 43/4 |
| 4,817,325 A | * | 4/1989 | Thomas | 43/43.2 |
| 4,930,249 A | * | 6/1990 | Johns | 43/43.16 |
| 5,319,876 A | * | 6/1994 | Vlahek | 43/43.4 |
| 5,775,023 A | * | 7/1998 | Botkins | 43/4 |
| 5,787,635 A | * | 8/1998 | Lin et al. | 43/57.1 |
| 5,806,235 A | * | 9/1998 | Martin | 43/57.1 |
| 6,041,541 A | * | 3/2000 | Davis | 43/4 |
| 6,438,892 B1 | * | 8/2002 | Oberman et al. | 43/4 |
| 6,474,013 B2 | * | 11/2002 | Terry | 43/57.1 |

FOREIGN PATENT DOCUMENTS

| | | | |
|---|---|---|---|
| CA | 600540 B1 | * | 6/1960 |
| GB | 1319312 B1 | * | 6/1973 |
| GB | 2324016 A1 | * | 10/1998 |
| JP | 10-33091 B1 | * | 2/1998 |
| JP | 11-155447 B1 | * | 6/1999 |
| JP | 2000-23607 B1 | * | 1/2000 |

* cited by examiner

Primary Examiner—Darren W. Ark
(74) Attorney, Agent, or Firm—Angenehm Law Firm; N Paul Friederichs

(57) ABSTRACT

A fishing device, including a wall, the wall defining a large opening, a small opening, and a slit, the large opening operably communicating with the small opening through the slit; and an interior surface of the wall, the interior surface being frustoconical in shape and a method of threading a fishhook including the steps of at least partially circumscribing an eyelet of a fishhook with a curved surface of a wall; and directing fishing line adjacent the curved surface and through the eyelet.

14 Claims, 2 Drawing Sheets

FISHHOOK THREADER

The present invention relates to fishing tools, more specifically to a tool used to threader fishing line through a fishing hook and claims priority from provisional patent application No. 60/202,707, filed May 9, 2000, and entitled FISHHOOK THREADER AND METHOD OF USE.

BACKGROUND OF THE INVENTION

FIELD OF THE INVENTION

Fishing is a sport enjoyed by many people, both young and old; a pastime that is often considered both relaxing and exciting. The sport is exhilarating for both the novice and the expert. One of the first steps in fishing is to tie a fishhook on to a fishing line. Fishing line is fed through the eye of the hook and then is tied in one of a variety of knots. Eyes, however range in size from large to very small, which are often difficult to negotiate with the fishing line.

Numerous people, having poor hand-eye coordination enjoy fishing. Poor eyesight creates difficulty in seeing the eyelets, especially the small ones and leads to difficulty in aligning the line with the eyelet. Shaking hands make directional control over the line and eyelet difficult. Eyesight may be impaired as a physical manifestation of the angler or environmentally, e.g., darkness, rain against eyeglasses or other. Hand control may be impaired as a physical manifestation of the angler or environmentally, e.g., rocking boat, cold (causing shivering) or other. The combination between eyesight and hand control impairment relates to the difficulty in inserting the fishing line through the eye of a fishing hook.

U.S. Pat. No. 6,041,541 issued to Davis on Mar. 28, 2000 discloses a Fishing Line Threader. The device has a tapered interior wall, which guides the line to the hook opening. The hook eye is disposed at the bottom of the tapered wall. The device is attachable to the eye and crushable to remove it from the eye. The crushable feature makes storage of the device in a tackle box difficult. This device has problems in that it requires matching the bottom of the tapered wall up with the eye. An angler capable of such alignment may just as well orient the line up with the eye. The hard device does not form around the eye, leaving gaps where the line may be misdirected. Other inconveniences are also present with this device.

What is needed is a line threader suitable for using with round eyelets. The threader should be suitable for use with eyelets of a variety of sizes, be deformable to adjust to the size of the eye, be self-aligning and be non-crushable.

SUMMARY OF THE INVENTION

The present invention is a device and method for expanding the effective diameter of eyelets, which fits eyelets of different diameters. Preferably, it is water resistant, durable, compressible, resilient and lightweight.

The present invention is a fishing device that preferably includes a fishhook with an eyelet, a fishing line, a frustocone having a wall, the wall defining a large opening and a small opening, a notch in the wall adjacent to the large opening, the notch joining with a slit, which cooperative extend from the large opening to the small opening, the wall defining a second small opening adjacent to the large opening, and a lanyard attached through the second small opening.

The present invention is also a method including the steps of at least partially circumscribing an eyelet of a fishhook with a curved surface of a wall; and directing fishing line adjacent the curved surface, through the eyelet and then beyond the curved surface. The curved surface in cross-section may be dish-shaped, circular or a blend.

Advantageously, the present invention provides a funnel or frustoconically shaped member that circumscribes an opening or eyelet as opposed to the funnel being placed adjacent or into the eyelet.

As a further advantage, the present invention includes a threader that is formed of a compressible material into which the eyelet may embed such that the interior surface of the threader and interior surface of the eyelet are co-extensive.

As another advantage, the present invention has a threader that includes a v-shaped notch to guide an eyelet into the interior of a threader.

As yet another advantage the present invention includes a threader with a vertical slit such that the eyelet and line can be extracted generally perpendicularly to the central axis of the threader.

As yet another advantage the present invention includes a single piece homogenous threader.

As still yet another advantage a threader is provided with a guide for placing an eyelet in alignment with the threader and a guide for placement of line in alignment with the eyelet.

DETAILED DESCRIPTION

Figure 1:
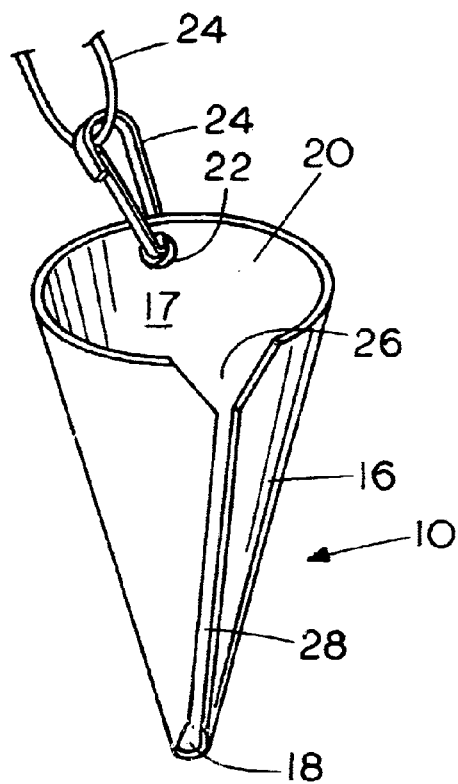
FIG. 1 shows a front view of the present invention.

The present inventive device 10, shown in FIGS. 1 through 5, includes a fishhook 12 with an eyelet 12a, a fishing line 14, and a threader mechanism 16 for threading a fishhook. These will be described in greater detail below.

"Fishhook" is hereinafter defined as a jig, fishing lure, simple fishhook and all other mechanisms used to hook fish, while angling. Fishhook 12 may be any fishhook now available or available in the future. Eyelet 12a of fishhook 12 is intended to be any eyelet of a wide variety of sizes of eyelets. Fishing line 14 may be any fishing line used for fishing.

Threader 16 may be of a variety of sizes, and materials. Threader 16 may range from more than three inches in length to less than ½ inch in length. Preferably, threader 16 will be approximately two inches in length.

Threader 16 may be made of a flexible material that has a memory. Preferably, threader 16 is made from a compressible, resilient and homogenous material. The material may be plastic, paper, rubber or any other suitable material. Preferably, the threader mechanism 16 will be plastic or rubber. The material may be sufficiently compressible to embed an eyelet 12a of a hook 12 into the wall 17.

Threader 16 may be a variety of shapes. Threader 16 may be a u-shaped trough. The interior surface of the threader 16 may be funnel-shaped. Preferably, the entire threader 16 will be a frustocone or funnel-shape. Threader 16 includes a wall 17, which may define a small opening 18 at a first end of threader 16 and a large opening 20 at the opposing end, which openings 18,20 may operably communicate through slit 28. Wall 17, which may be of uniform thickness, may also define a second small opening 22 located in the top portion of threader 16 as shown in FIG. 1.

A notch 26, which may be v-shaped, is positioned adjacent and in operable communication with large opening 20, such that notch 28 and wall 17 provide mechanism for guiding the eyelet 12a into the interior of the threader 16. A slit 28 in operable communication with notch 26 may optionally extend to the small opening 18, although the slit 28 may or may not be in operable communication with the small opening 18. Slit 28 may engage the shank of the hook 12 and stabilize the hook 12 relative to the threader 16.

Threader 16 may include attachment mechanism 24. Attachment mechanism 24 is preferably a lanyard, key ring or other such device. The lanyard 24 is secured through the second small opening 22. The angler may use the lanyard 24 to wear threader 16 around his/her neck or wrist when fishing.

Figure 5:
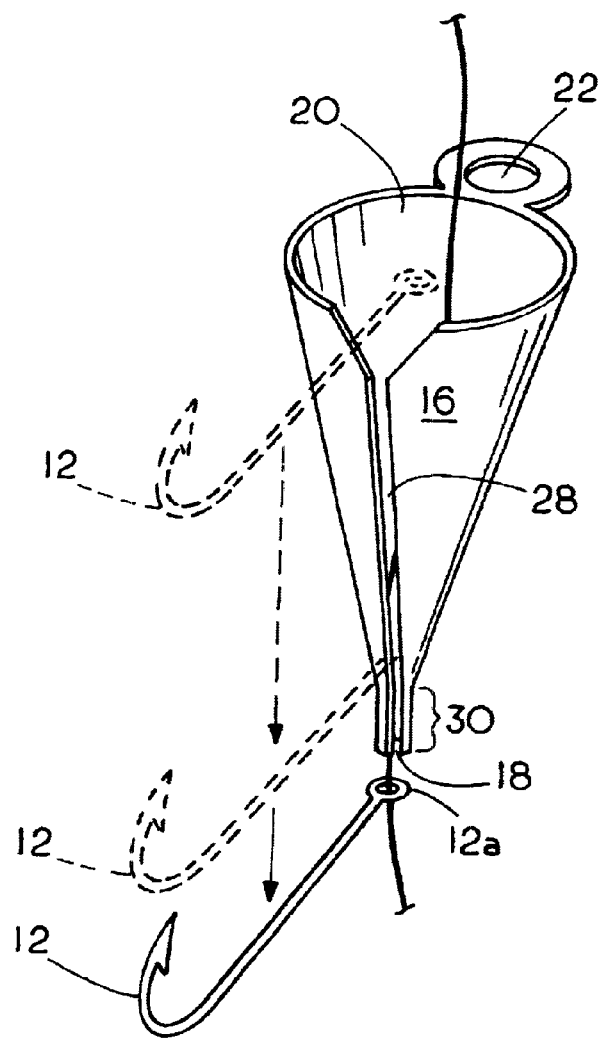
FIG. 5 shows the invention in operation.

Referring to FIG. 5, the threader 16 is removed from a tackle box or from around the angler's neck or wrist. The eyelet 12a of the fishhook 12 is fed from notch 26 down through slit 28 towards the small opening 18 to a point inside the threader 16 between the small opening 18 and large opening 20. At least a portion of the interior surface of the threader 16 circumscribes at least a portion of eyelet 12a. For example, threader 16 may circumscribe the eyelet 12a. Eyelet 12a may be co-axial with threader 16. The outside wall 17 may be squeezed against eyelet 12a to conform the threader 16 about the eyelet 12a, e.g., embed the eyelet 12 into wall 17, which prevents the wire edge of the eyelet 12a from presenting an obstacle to line 14 being passed through the threader 16. That is, the eyelet 12a may embed into wall 17, either manually or through an preformed indentation, such that the interior surface of the threader 16 and interior surface of the eyelet 12a are co-extensive. The angler slides fishing line 14 adjacent the curved interior surface of the threader 16, through the eyelet 12a and past the curved interior surface of the threader 16, perhaps until a length of fishing line 14 has extended beyond the small opening 18. The angler may now remove the threader 16 by sliding the line 14 and eyelet 12a through slit 28. Once threader 16 has been removed from around the fishing line 14, the angler may tie a knot in the fishing line 14.

Figure 2:
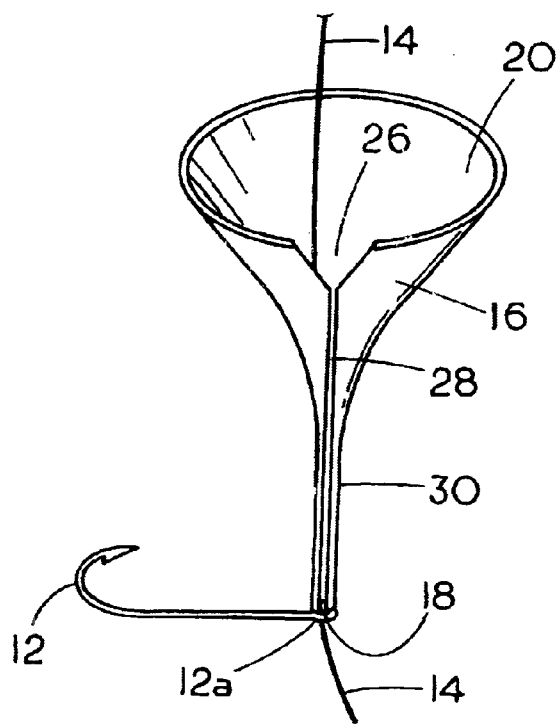
FIG. 2 shows an alternative embodiment of the present invention while in use.

In an alternative embodiment, threader 16 includes a neck 30 as shown in FIG. 2. Neck 30 is an elongated channel. Neck 30 may range from longer than three inches to less than ¼ inch in length. Neck 30 continues to narrow in diameter as it approaches small opening 18. An angler may insert different sized eyelets 12a into threader 16 and still obtain a snug or imbedded fit. The angler moves fishhook 12a toward small opening 18 until threader 16 tightly circumscribes eyelet 12a. The angler may now finish threading the eyelet 12a with fishing line 14 as before described.

Figure 3:
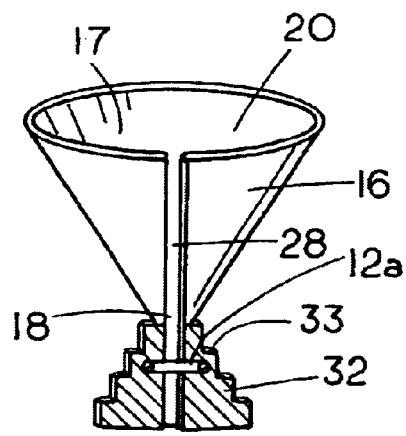
FIG. 3 shows a front view of a third embodiment.

Shown in FIG. 3 is a second alternative embodiment. This embodiment is hourglass shaped. This embodiment includes an additional frustocone 32 attached to small opening 18. The interior surface of the additional frustocone 32 may be stair-stepped down from small opening 18. The stair-stepped design effectively embeds the eyelet 12a into the wall 17 without the need for squeezing threader 16. Eyelet 12a is adjusted, through slit 28, either up through the additional frustocone 32 or down through the top portion of the threader 16. Once the eyelet 12a reaches a point where it is tightly secured within the threader 16, the angler may finish threading hook 12 in the same manner described above.

Figure 4:
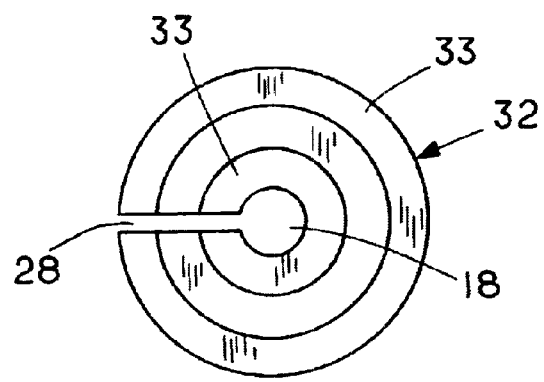
FIG. 4 shows a bottom view of a fourth embodiment.

The stair-steps also allows the present invention 10 to be used with various sized eyelets 12a. When eyelet 12a is adjusted upward through additional frustocone 32, eyelet 12a will be stopped at the step whose diameter is equal to or slightly smaller than the diameter of eyelet 12a. The steps perform the same function as lining up the interior wall 17 with eyelet 12a. Shown in FIG. 4 is a bottom view of the additional frustocone 32.

Preferably, threader 16 is frustoconical though this is unnecessary in the strictest sense of the term. As previously mentioned the threader 16 may be in the form of a u-shaped trough much like a bowl in cross section. The term "frustocone" is intended to convey the meaning of an interior wall having a tapered surface extending from a large opening 20 to a small opening, 18. Threader 16 provides a large target area to enable anglers to thread fishing line 14 into a small target, i.e. eyelet 12a. Anglers with poor vision, shaky hands or other interference with hand-eye coordination may easily thread fishing line 14 through the large opening 20 through the eyelet 12a. Threader 16 further directs the fishing line 14 so as to enable easy threading of eyelet 12a.

Although the present invention has been described with reference to preferred embodiment, workers skilled in the art will recognize changes may be made in form and detail without departing from the spirit and scope of the invention.

I claim:

1. A fishhook threader, comprising:
   a hook with an eyelet:
   a wall, the wall defining a large opening, a small opening, and a slit, the slit extending from the large opening to the small opening and adapted to snugly receive a shank of the fishing hook therethrough, the wall being sufficiently compressible to selectively embed the eyelet of the hook into the wall such that an interior surface of the wall, while in circumscribing contact with the eyelet of the hook, is alignable with an interior surface of the eyelet of the hook, and the wall being sufficiently resilient to return to an original shape when the embedded eyelet of the hook is removed from the wall; and the interior surface of the wall being frustoconical in shape, the interior surface of the wall sized and adapted to snugly receive the eyelet of the hook therein.

2. The fishhook threader of claim 1 wherein the wall further defines a lanyard opening adjacent the large opening.

3. The fishhook threader of claim 2 further comprising a lanyard joined to the wall through the lanyard opening.

4. The fishhook threader of claim 1 wherein the fishhook threader is homogenous.

5. The fishhook threader of claim 1 wherein the wall is homogenous with a neck adjacent the small opening.

6. The fishhook threader of claim 1 wherein the interior surface of the wall is adapted to circumscribe an eyelet of a hook.

7. The fishhook threader of claim 1 wherein the wall further defines a notch, the notch being positioned adjacent and in operable communication with the large opening and the notch being in operable communication with the slit.

8. The fishhook threader of claim 1 wherein the wall is of a generally uniform thickness.

9. The fishhook threader of claim 1 wherein the wall is a guide for positioning of the eyelet of the hook.

10. A fishhook threader, comprising:
    a hook with an eyelet;
    a wall, the wall defining a large opening, a small opening, and a slit, the large opening operably communicating with the small opening and the large opening operably communicating with the slit, the wall being of generally uniform thickness from the large opening to the small opening and sufficiently compressible to selectively embed the eyelet of the hook into the wall such that an interior surface of the wall, while in circumscribing contact with the eyelet of the hook, is alignable with an interior surface of the eyelet of the hook, and the wall being sufficiently resilient to return to an original shape when the eyelet of the hook is removed from the wall; and the interior surface of the wall being frustoconical in shape and the interior surface of the wall snugly circumscribing the eyelet.

11. The fishhook threader of claim 10 wherein the device is homogenous.

12. The fishhook threader of claim 10 wherein the wall is homogenous with a neck, the neck providing at least a portion of a pathway from the large opening to the small opening.

13. The fishhook threader of claim 10 wherein the wall further defines a notch, the notch being positioned adjacent and in operable communication with the large opening and the notch being in operable communication with the slit.

14. The fishhook threader of claim 10 wherein the wall is a guide for positioning of the eyelet of the hook.

* * * * *